United States Patent Office 3,326,907
Patented June 20, 1967

3,326,907
NOVEL 6-HALO-4-IMINO-1,3,5-DITHIAZINE SALTS
Francis Johnson, Newton Lower Falls, Mass., assignor to The Dow Chemical Company, Midland, Mich., a corporation of Delaware
No Drawing. Filed Apr. 30, 1964, Ser. No. 363,977
20 Claims. (Cl. 260—243)

This invention relates to novel derivatives of 1,3,5-dithiazine and to methods of preparing said derivatives.

Previous methods used in attempts to prepare derivatives of the 4H-1,3,5-dithazine ring system have lead only to compounds having exocyclic double bonds.

It is a fundamental object of this invention to prepare derivatives of the 4H-1,3,5-dithiazine ring system. It is another object of this invention to provide processes for synthesizing said derivatives. Other objects and advantages of the invention will in part be obvious and will in part appear hereinafter.

The invention, accordingly, is directed to the preparation of the hydrohalide salts of 6-halo-4-imino-1,3,5-dithiazines by cyclizing alkyl or aralkyl gemdithiocyanates, with an anhydrous hydrogen halide in an inert solvent. The synthesis is illustrated in the following equation:

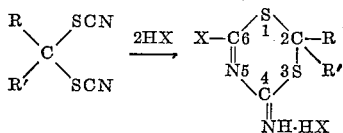

The reactant gem-dithiocyanates have the general formula $C(R)(R')(SCN)_2$, wherein R and R' may each be hydrogen, a lower alkyl, or a monocyclic aryl. When R and R' are lower alkyl, the two R groups may be in the form of a ring resulting in compounds such as cyclohexyl-1,1-bisthiocyanate. The R and R' groups may be unsubstituted or may contain substituents such as halide, carboxy, ester, alkyl, phenyl e.g., causing the methyl to become benzyl, etc. Illustrative R and R' groups include methyl, butyl, chloro-ethyl, tolyl, chloro-phenyl, nitrophenyl, fluoro-phenyl, pentachlorophenyl, benzyl, methoxyphenyl, bromophenyl, carbethoxyphenyl, carbethoxy, chloromethyl, and trichloromethyl.

The useful hydrogen halides are hydrogen chloride, hydrogen bromide, and hydrogen iodide. There should be at least two equivalents of the hydrogen halide to one equivalent of the bisthiocyanate reactant to obtain complete conversion. It is preferable to use a slight excess of the hydrogen halide to insure complete and rapid reaction.

The cyclization reaction should be carried out below about 50° C. At temperatures above 50° C., some attack by the solvent on the compounds can occur, especially when utilizing ether or glacial acetic acid as the solvent. It is preferable to carry the reaction out at temperatures between about —10° C. and +10° C. because good yields are obtained in this temperature range. Pressure is not a factor. The reaction should be carried out under anhydrous conditions. The reaction is usually complete in about one hour, although longer reaction is not detrimental. The bisthiocyanate is dissolved or suspended in an inert solvent such as ether, benzene, glacial acetic acid, propionic acid, tetramethylene sulfone, acetone, or methyl ethyl ketone.

In the usual preparation, the bisthiocyanate reactant is dissolved or suspended in the solvent and the hydrogen halide passed through the reaction mixture causing precipitation of a crystalline product. The flow of the hydrogen halide is usually continued until further precipitation of the crystalline product stops. The crystalline product is recovered from the reaction mixture by filtration, in the form of the hydrogen halide salt. The salts are yellowish-white crystalline substances having fairly high melting points. They decompose on strong heating. They are sensitive to moisture.

For the purpose of further teaching the invention to those skilled in the art, the following illustrative examples are given:

*Example I.—Preparation of the hydrogen bromide salt of 6-bromo-4-imino-1,3,5,-dithiazine*

A solution of methylene bisthiocyanate (5 g.) in a mixture of methylene chloride (100 ml.) and diethyl ether (200 ml.) was cooled to —20° C. and hydrogen bromide sparged through the solution until precipitation of the white solid, which appears, is complete. The solid was then removed by filtration, washed thoroughly with ether and methylene chloride and dried in a stream of dry nitrogen. Yield 10.1 g. (90%) M.P. 180° C. (decomposed). Found by analysis: C, 12.5%; H, 1.5%; Br, 54.9%; N, 94%; S, 22.1%; calculated for $C_3H_4Br_2N_2S_2$: C, 12.3%; H, 1.4%; Br, 54.7%; N, 9.6%; S, 22.0%.

*Example II.—Preparation of the hydrogen bromide salt of 6-bromo-4-imino-2-methyl-1,3,5-dithiazine*

Ethylidene bisthiocyanate (4.0 g.) in diethyl ether (100 ml.) was treated with a stream of gaseous hydrogen bromide at 0° C. for fifteen minutes. The crystalline precipitate which formed was removed by filtration, washed with ether, and dried under nitrogen. Yield 5.3 g. (64%), M.P. 160° (decomposed). Found by analysis: C, 15.7%; H, 1.8%; Br, 52.1%; N, 9.1%; S, 21.0%; calculated for $C_4H_6Br_2N_2S_2$: C, 15.7%; H, 2.0%; Br, 52.3%; N, 9.2%; S, 20.9%.

Following the procedure of Examples I and II:

Propane 2,2-bisthiocyanate is used to prepare the hydrogen bromide salt of 6-bromo-4-imino-2,2-dimethyl-1,3,5-dithiazine;

Toluene-α,α-bisthiocyanate is used to prepare the hydrogen bromide salt of 6-bromo-4-imino-2-phenyl-1,3,5-dithiazine, and also the corresponding hydrogen chloride and hydrogen iodide salts;

Diphenylmethyl-α,α-bisthiocyanate is used to prepare the hydrogen bromide salt of 6-bromo-4-imino-2,2-diphenyl-1,3-5-dithiazine;

1,3-diphenylpropyl-2,2-bisthiocyanate is used to prepare the hydrogen bromide salt of 6-bromo-4-imino-2,2-dibenzyl-1,3,5-dithiazine;

1-phenylethyl-2,2-bisthiocyanate is used to prepare the hydrogen iodide salt of 6-iodo-4-imino-2-benzyl-1,3,5-dithiazine;

Cyclohexyl-1,1-bisthiocyanate is used to prepare the hydrogen bromide salt of 6-bromo-4-imino-2,2-pentamethylene-1,3,5-dithiazine;

Cyclopentyl-1,1-bisthiocyanate is used to prepare the hydrogen bromide salt of 6-bromo-4-imino-2,2-tetramethylene-1,3,5-dithiazine.

The compounds of the present invention are useful as insecticides. They are also useful in preventing and/or controlling growth of marine organisms. Thus, the product of Example II provided 100% control of Southern Army Worm at 500 p.p.m. and 90% control of Daphnia at 2 p.p.m.

Although my invention has been illustrated by specific examples, it is to be understood that it includes all modifications and variations that come within the scope of the appended claims.

What is claimed is:

1. The hydrogen halide salt of 6-halo-4-imino-1,3,5-dithiazine of the formula

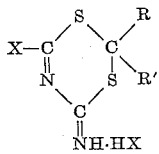

wherein X is a halogen selected from the group consisting of chlorine, bromine, and iodine, and R and R' are each selected from the group consisting of hydrogen, lower alkyls phenyl and benzyl.

2. The halogen bromide salt of 6-bromo-4-imino-1,3,5-dithiazine.
3. The hydrogen bromide salt of 6-bromo-4-imino-2-methyl-1,3,5-dithiazine.
4. The hydrogen bromide salt of 6-bromo-4-imino-2,2-dimethyl-1,3,5-dithiazine.
5. The hydrogen bromide salt of 6-bromo-4-imino-2-phenyl-1,3,5-dithiazine.
6. The hydrogen chloride salt of 6-chloro-4-imino-2-phenyl-1,3,5-dithiazine.
7. The hydrogen iodide salt of 6-iodo-4-imino-2-phenyl-1,3,5-dithiazine.
8. The hydrogen bromide salt of 6-bromo-4-imino-2,2-diphenyl-1,3,5-dithiazine.
9. The hydrogen bromide salt of 6-bromo-4-imino-2,2-dibenzyl-1,3,5-dithiazine.
10. The hydrogen iodide salt of 6-iodo-4-imino-2-benzyl-1,3,5-dithiazine.
11. The hydrogen bromide salt of 6-bromo-4-imino-2,2-pentamethylene-1,3,5-dithiazine.
12. The hydrogen bromide salt of 6-bromo-4-imino-2,2-tetramethylene-1,3,5-dithiazine.
13. The process for providing a hydrogen halide salt of 6-halo-4-imino-1,3,5-dithiazine comprising reacting a dithiocyanate having the formula $C(R)(R')(SCN)_2$ wherein R and R' are each selected from the group consisting of hydrogen, lower alkyl, phenyl and benzyl, in an inert solvent, with an anhydrous hydrogen halide, at temperature below 50° C.
14. The process of claim 13 wherein the temperature is maintained between about −10° C. and 10°C.
15. The process of claim 14 wherein at least two equivalents of the hydrogen halide are used per equivalent of the gem-dithiocyanate.
16. The process of claim 15 wherein the hydrogen halide is hydrogen chloride.
17. The process of claim 15 wherein the hydrogen halide is hydrogen bromide.
18. The process of claim 15 wherein the hydrogen halide is hydrogen iodide.
19. The process of claim 15 wherein R and R' are hydrogen.
20. The process of claim 15 wherein R is hydrogen and R' is a lower alkyl.

References Cited
UNITED STATES PATENTS

| | | | |
|---|---|---|---|
| 2,727,036 | 12/1955 | McDermott | 260—243 |
| 3,281,417 | 10/1966 | Beck et al. | 260—243 |

WALTER A. MODANCE, *Primary Examiner.*

JOHN M. FORD, *Assistant Examiner.*